(12) United States Patent
Rao et al.

(10) Patent No.: US 7,082,549 B2
(45) Date of Patent: Jul. 25, 2006

(54) METHOD FOR FAULT TOLERANT UPDATING OF AN ELECTRONIC DEVICE

(75) Inventors: Bindu Rama Rao, Laguna Niguel, CA (US); Patrick O'Neill, Dana Point, CA (US)

(73) Assignee: Bitfone Corporation, Laguna Niguel, CA (US)

( * ) Notice: Subject to any disclaimer, the term of this patent is extended or adjusted under 35 U.S.C. 154(b) by 281 days.

(21) Appl. No.: 10/636,864

(22) Filed: Aug. 7, 2003

(65) Prior Publication Data

US 2004/0123282 A1 Jun. 24, 2004

Related U.S. Application Data

(63) Continuation-in-part of application No. 10/311,462, filed as application No. PCT/US01/44034 on Nov. 19, 2001.

(60) Provisional application No. 60/249,606, filed on Nov. 17, 2000, provisional application No. 60/434,712, filed on Dec. 18, 2002.

(51) Int. Cl.
*G06F 11/08* (2006.01)

(52) U.S. Cl. .................. 714/6; 707/203; 707/204; 711/162; 714/5; 714/7; 714/8; 714/20

(58) Field of Classification Search .................. None
See application file for complete search history.

(56) References Cited

U.S. PATENT DOCUMENTS

| 5,261,055 A | 11/1993 | Moran et al. |
| 5,442,771 A | 8/1995 | Filepp et al. |
| 5,479,637 A | 12/1995 | Lisimaque et al. |
| 5,579,522 A | 11/1996 | Christeson et al. |
| 5,596,738 A | 1/1997 | Pope |
| 5,598,534 A | 1/1997 | Haas |
| 5,608,910 A | 3/1997 | Shimakura |
| 5,623,604 A | 4/1997 | Russell et al. |
| 5,666,293 A | 9/1997 | Metz et al. |
| 5,752,039 A | 5/1998 | Tanimura |
| 5,778,440 A | 7/1998 | Yiu et al. .................. 711/154 |
| 5,790,974 A | 8/1998 | Tognazzini .................. 701/204 |
| 5,878,256 A | 3/1999 | Bealkowski et al. |
| 5,960,445 A | 9/1999 | Tamori et al. .............. 707/203 |
| 6,009,497 A | 12/1999 | Wells et al. ................. 711/103 |

(Continued)

FOREIGN PATENT DOCUMENTS

CA 2339923 3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—B. James Peikari
(74) *Attorney, Agent, or Firm*—McAndrews, Held & Malloy

(57) ABSTRACT

Methods for updating an electronic device having a non-volatile memory are disclosed. An embodiment of the present invention may permit the update of an electronic device from a first code version to a second code version using a fault-tolerant, bank-by-bank method. An update package comprising update instructions may be received via a public and/or wireless network, and the update instructions may be used to convert the first code version to the second code version. The bank order of the conversion may be specified in the update package, and may be non-sequential.

30 Claims, 6 Drawing Sheets

U.S. PATENT DOCUMENTS

| | | | |
|---|---|---|---|
| 6,038,636 A | 3/2000 | Brown, III et al. | 711/103 |
| 6,064,814 A | 5/2000 | Capriles et al. | |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | |
| 6,112,197 A | 8/2000 | Chatterjee et al. | 707/3 |
| 6,126,327 A | 10/2000 | Bi et al. | |
| 6,128,695 A | 10/2000 | Estakhri et al. | 711/103 |
| 6,157,559 A | 12/2000 | Yoo | 365/52 |
| 6,163,274 A | 12/2000 | Lindgren | |
| 6,198,946 B1 | 3/2001 | Shin et al. | |
| 6,279,153 B1 | 8/2001 | Bi et al. | 717/11 |
| 6,311,322 B1 | 10/2001 | Ikeda et al. | 717/1 |
| 6,438,585 B1 | 8/2002 | Mousseau et al. | 709/206 |
| 6,757,893 B1 * | 6/2004 | Haikin | 717/170 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0099950 A1 * | 7/2002 | Smith | 713/200 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2002/0188886 A1 * | 12/2002 | Liu et al. | 714/6 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |

FOREIGN PATENT DOCUMENTS

| | | | |
|---|---|---|---|
| JP | 61173360 A * | 8/1986 | |
| JP | 8202626 | 8/1996 | |
| JP | 11161479 A * | 6/1999 | |
| KR | 2002-0034228 | 5/2000 | |
| KR | 2001-0100328 | 11/2001 | |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

METHOD FOR FAULT TOLERANT UPDATING OF AN ELECTRONIC DEVICE

RELATED APPLICATIONS

This application is a Continuation-In-Part of U.S. patent application Ser. No. 10/311,462, "SYSTEM AND METHOD FOR UPDATING AND DISTRIBUTING INFORMATION," filed on Dec. 13, 2002, having a 371(c) date of May 13, 2003, which is a national phase filing based on a PCT application No. PCT/US01/44034, filed Nov. 19, 2001, which in turn claims priority to U.S. Provisional Application Ser. No. 60/249,606 filed Nov. 17, 2000. This application also makes reference to, claims priority to and claims benefit from U.S. Provisional Patent Application Ser. No. 60/434,712, entitled "Mobile Handset With A Fault Tolerant Update Agent", filed on Dec. 18, 2002.

INCORPORATION BY REFERENCE

The complete subject matter of U.S. Provisional Patent Application Ser. No. 60/434,712, entitled "Mobile Handset With A Fault Tolerant Update Agent", filed on Dec. 18, 2002 is hereby incorporated herein by reference, in its entirety. In addition, this application makes reference to U.S. Provisional Patent Application Ser. No. 60/249,606, entitled "System and Method for Updating and Distributing Information", filed Nov. 17, 2000, and International Patent Application Publication No. WO 02/41147 A1, entitled "System and Method for Updating and Distributing Information", publication date May 23, 2002, the complete subject matter of which are hereby incorporated herein by reference, in their entirety. This application also makes reference to U.S. Provisional Patent Application Ser. No. 60/461,248, entitled "Electronic Device With An Update Agent That Employs Preprocessing Techniques for Update", filed Apr. 8, 2003, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices such as mobile phones and personal digital assistants (PDA's) contain firmware and application software that are provided by the manufacturers of the electronic devices, by telecommunication carriers, or by third parties. This firmware and application software often contains software errors or "bugs". In addition, software developers may add new features over the life of the software. Therefore, new versions of the firmware and software are periodically released to fix the bugs, to introduce new features, or both.

The process of updating such a device is relatively complex, and there are many potential sources of interruption of the update process. These include exhaustion of the battery operating the device, loss of the communication link used for the update, and interruption by outgoing or incoming calls. If the firmware/software of a mobile handset is updated and the mobile handset becomes inoperative, the user is likely to lose the use of the device for a period of time, may be required to return the device to a service center, and will most likely be very disappointed with the service that disseminated the associated firmware/software update. For these reasons, the process of providing firmware/software updates to mobile handsets needs to be fault-tolerant. Unfortunately, these devices are constrained in many ways, and achieving fault-tolerant update behavior is not easy, requiring great care in the design and management of the related activities.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be found in a method of updating an electronic device comprising a non-volatile memory having a plurality of banks containing a first code version, the method comprising selecting one of the plurality of banks, duplicating the selected bank to a working bank, copying the selected bank to a backup bank, and converting the contents of the working bank from the first code version to a second code version. The method may further comprise moving the converted working bank to the selected bank, verifying the successful completion of at least one of the duplicating, the copying, and the converting using at least one of a cyclic redundancy check, a message digest, a digital signature, and a checksum. The method may repeat the prior actions until each of the plurality of banks has been updated. The converting in an embodiment of the present invention may use at least one update instruction, the working bank may be in volatile memory, and the selecting may use at least one of at least a cyclic redundancy check, a message digest, a digital signature, a checksum, and a specified bank order. The selecting may use at least one of a cyclic redundancy check, a message digest, a digital signature, and a checksum when resuming the updating following one of at least a reset or a power up, and the selecting may use a specified bank order at all other times.

An embodiment in accordance with the present invention may further comprise receiving an update package. The update package may comprise at least one update instruction, and the update package may comprise a bank order specification. The receiving may be accomplished using a public network, and the receiving may be accomplished using a wireless network. An embodiment of the present invention may further comprise determining the progress of the updating using at least one of at least a cyclic redundancy check, a message digest, a digital signature, and a checksum. In addition, the converting may use at least a portion of at least one of the plurality of banks other than the selected bank.

Further aspects of the present invention may be observed in a method of updating an electronic device from a first code version to a second code version, the electronic device comprising a non-volatile memory having a plurality of banks containing the first code version, the method comprising receiving an update package comprising at least one update instruction and selecting one of the plurality of banks using at least one of at least a cyclic redundancy check, a message digest, a digital signature, a checksum, and a specified bank order. Such a method may also comprise converting the selected bank from the first code version to the second code version using the at least one update instruction and repeating the receiving, selecting, and converting in a bank by bank manner until each of the plurality of banks has been updated. The selecting may use at least one of at least a cyclic redundancy check, a message digest, a digital signature, and a checksum when resuming the updating following at least one of a reset and a power up, and the selecting may use a specified bank order at all other times. The converting in an embodiment of the present invention may further comprise duplicating the selected bank to a working bank, copying the selected bank to a backup bank, transforming the contents of the working bank from the first code version to the second code version, and moving the transformed contents of the working bank to the selected bank. The working bank may be located in volatile memory, and the converting may use at least a portion of at least one of the plurality of banks other than the selected bank.

In an embodiment in accordance with the present invention, the update package may comprise a bank order specification, and the banks may be selected in a non-sequential bank order. The receiving may be via a public network, and the receiving may be via a wireless network.

Additional aspects of the present invention may be seen in a method of updating an electronic device from a first code version to a second code version, in which the electronic device comprises a non-volatile memory having a plurality of banks containing the first code version. The method may comprise receiving an update package comprising at least one update instruction using a public network, selecting one of the plurality of banks, and converting the selected bank from the first code version to the second code version using the at least one update instruction. The method may repeat the receiving, selecting, and converting in a bank by bank manner until each of the plurality of banks has been updated.

In an embodiment in accordance with the present invention, the converting may further comprise duplicating the selected bank to a working bank, copying the selected bank to a backup bank, transforming the contents of the working bank from the first code version to the second code version, and moving the transformed contents of the working bank to the selected bank. The working bank may be is located in volatile memory, and the transforming may use the original and the transformed contents of the previously updated bank, in addition to at least one other of the plurality of banks. The converting may use at least a portion of at least one of the plurality of banks other than the selected bank. The selecting may use at least one of at least a cyclic redundancy check, a message digest, a digital signature, and a checksum when resuming the updating following at least one of a reset and a power up, and the selecting may use a specified bank order at all other times. The update package may comprise a bank order specification, and the one of the plurality of banks may be selected in a non-sequential bank order.

Yet another aspect of the present invention may be seen in an update package for updating an electronic device, where the electronic device comprises a memory having a plurality of banks. The update package may comprise difference information and a collection of post-update signatures, where each post-update signature corresponds to one of the plurality of banks to be updated. At least one of the collection of post-update signatures may be used in resuming the updating following an interruption, and may be one of at least a cyclic redundancy check, a message digest, a digital signature, and a checksum.

These and other features and advantages of the present invention may be appreciated from a review of the following detailed description of the present invention, along with the accompanying figures in which like reference numerals refer to like parts throughout.

DETAILED DESCRIPTION OF THE INVENTION

The present invention relates generally to firmware/software updates in mobile handsets and, more specifically, to the fault tolerant update of firmware/software from one version to another in mobile handsets.

Figure 1:
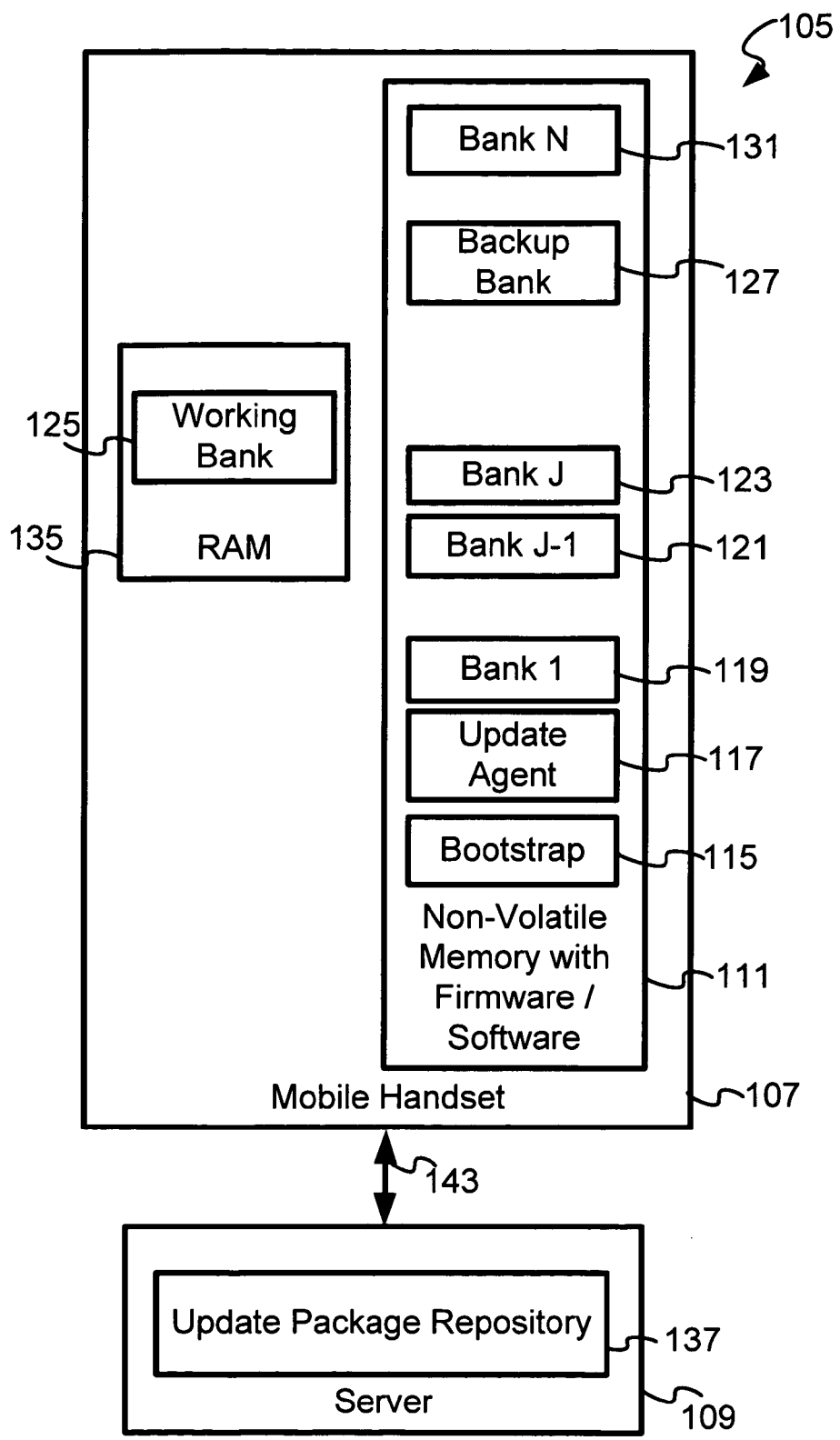
FIG. 1 shows a block diagram of an exemplary mobile handset having a fault tolerant update agent that facilitates firmware/software updates, in accordance with the present invention.

FIG. 1 shows a block diagram of an exemplary mobile handset 107 having a fault tolerant update agent 117 that facilitates firmware/software update, in accordance with the present invention. As illustrated in FIG. 1, the mobile handset 107 is capable of downloading an update package from a server 109 via communications link 143. The server 109 hosts a plurality of update packages in an update package repository 137. The mobile handset 107 comprises a non-volatile memory 111, a volatile memory area 135, and a communication means (not shown) to interact via communications link 143 with external systems such as the server 109. The non-volatile memory 111 may comprise, for example, FLASH memory, and may be used to store the firmware/software of mobile handset 107. The volatile memory area 135 may comprise, for example, random access memory (RAM), in which programs may be executed, program variables stored, code segments modified, etc. For the purposes of the following discussion, the terms "original" and "old" shall refer to the contents of a bank/block of memory prior to performing the current update operation.

In an embodiment in accordance with the present invention, the fault-tolerant update agent 117 may employ the working bank 125 in the volatile memory area 135 and the backup bank 127 in the non-volatile memory 111 to implement a fault tolerant update process. Such a fault tolerant update process ensures operation of a mobile handset such as mobile handset 107 in a stable/recoverable state during and after a firmware/software update, in spite of interruptions such as, for example, power failures and other transient errors.

In an embodiment of the present invention, bootstrap code 115 in the non-volatile memory 111 may be executed at power-up or upon reboot of the mobile handset 107. If the bootstrap code 115 determines that an update package is available with which to update the firmware/software in the mobile handset 107, control is passed to the update agent 117. The update agent 117 may update the firmware/software in the mobile handset 107, specifically in bank 1 119 to bank N 131 of the non-volatile memory 111. The memory space occupied by the bootstrap code 115 and the update agent 117 are normally considered out-of-bounds for update activities. In an embodiment of the present invention, however, specific subcomponents of the update agent itself may be updated using the update process facilitated by the update agent 117.

In an embodiment of the present invention, the mobile handset 107 may download update packages from the server 109 to update firmware or software stored in non-volatile memory 111 of the mobile handset 107. When receipt of a specific update package is complete, the mobile handset 107 may transfer the complete update package into the non-volatile memory area 111. By copying the update package to the non-volatile area 111, a level of fault tolerance is achieved, and the mobile handset 107 may perform subsequent update operations without further communication with the server 109. Once the update package has been saved into non-volatile memory 111, a status table entry may be modified to reflect the complete receipt and secure storage of the update package in the mobile handset 107.

The update agent 117 in an embodiment of the present invention may allocate space for a "working" bank 125 and a "backup" bank 127 in the volatile memory 135 and the non-volatile memory area 111, respectively. The working bank 125 and the backup bank 127 may be used by the update agent 117 to perform operations on components of the existing code version stored in the non-volatile memory 111 in a manner such that the original code is not altered until the updated contents of the code section has been computed and verified to be correct. This ensures that the original code is not corrupted by unexpected processing errors or power interruptions. In one embodiment of the present invention, the update agent 117 may initialize a working bank pointer to point to a location in the volatile memory 135 where the bank update operations will take place (i.e., the "working bank"). In addition, a backup bank pointer may be initialized to point to a location in the non-volatile memory 111 (i.e., the "backup bank") where a copy of the bank being updated is maintained. The existence of the backup bank helps to insure fault tolerance in event of power interruptions and reboot or reset operations.

The update agent 117 in an embodiment of the present invention may employ a bank order specification. The bank order specification may be determined during the creation of the update package, and may be received from the update package repository 137 as part of the corresponding update package. The bank order specification may be used by update agent 117 to direct the sequence of the update of the various banks of memory such as bank1 119 through bank N 131, as necessary, in the non-volatile memory 111. The use of a bank order specification may permit the size of the update package to be optimized by controlling the bank update sequence. The update agent 117 may copy each of the bank 1 119 through bank N 131 to the working bank 125 according to the bank order specification, so that they may be modified or updated before they are written back into non-volatile memory area 111.

In one embodiment in accordance with the present invention, the update agent 117 may initially copy the contents of a selected bank of the non-volatile memory 111 such as bank J 123, into the working bank 125. The update agent may then update the working bank 125 as specified by update instructions contained in the update package, and may copy the updated working bank 125 to the backup bank 127. This copying of the updated working bank 125 to the backup bank 127 is done to provide fault tolerance. The update agent 117 may then copy the working bank 125 into the bank J 123 to update bank J 123. The update agent 117 may also perform a verification step after copying code segments or data between the non-volatile memory 111 and the volatile memory 135. The verification in such an embodiment may involve the computation of an MD5 checksum, a CRC, or similar calculated value. This computed verification value may then be compared with a predetermined value for the bank being updated, that is contained in the update package.

In another embodiment of the present invention, the update agent 117 may initially copy the contents of a selected bank of non-volatile memory 111, such as bank J 123, into the working bank 125. The update agent 117 may also copy the contents of bank J 123 into the backup bank 127. The update agent 117 may then update the working bank 125 according to the appropriate portion of the update instructions contained in the update package received from the update package repository 137, and copy the updated content of the working bank 125 into the bank J 123, to update the bank J 123. If a program failure or other interruption occurs before the successful copy of the updated contents of the working bank 125 into the bank J 123, the update agent 117 may retrieve the original contents of bank J 123 from the backup bank 127, in order to continue the interrupted update process.

In yet another embodiment of the present invention, the update agent 117 may initially copy the contents of a selected bank of non-volatile memory such as bank J 123 into the working bank 125. The update agent 117 may then update the working bank 125 according to the appropriate portion of the update instructions of the update package received from the update package repository 137. The update agent 117 may then copy the contents of the bank J 123 into the backup bank 127. Finally, the update agent 117 may copy the updated contents of the working bank 125 into the bank J 123, to update the bank J 123. If a program failure or other interruption occurs before the successful copy of the updated contents of the working bank 125 into the bank J 123, the update agent 117 may retrieve the original bank J 123 contents from the backup bank 127, and continue with the interrupted update process.

In a further embodiment of the present invention, the backup bank 127 may be used by the update agent 117 to store the original contents of a previously updated bank. This may make the original contents of the prior updated bank available for use by update instructions during the update of the current bank. For example, if the current bank to be updated is bank J 123, then in an embodiment of the present invention the contents of the updated bank J−1 121 may be available for use in updating bank J 123. In addition, the older version (i.e., the original contents) of bank J–1 121 may be available in the backup bank 127 for use in update processing. In such an embodiment, the update agent 117 may copy the contents of bank J 123 into the working bank 125, and update the working bank 125 as specified by a portion of the update instructions contained in the update package received from update package repository 137. The update instructions in the update package may employ the original contents of the bank J–1 121 that is available in the backup bank 127, in addition to the updated contents of bank J–1 121. Following the update of the working bank 125, the contents of bank J 123 may be copied to the backup bank 127, replacing the original contents of the bank J–1 121 in the backup bank 127. The updated contents of bank J 123 may then be copied from the working bank 125 to the bank J 123. In this manner, during an update of any bank J 123, the original contents of the bank J 123, the contents of the updated banks from bank 1 119 through bank J–1 121, the original contents of bank J–1 121 (stored in backup bank 127), and the original contents of banks J+1 (not shown) through bank N 131 are available for update processing. In particular, the availability of the original contents of bank J–1 121 stored as the contents of the backup bank 127, enhances the "context" or "locality of reference" used in the update process. This embodiment of the present invention makes it possible for the update agent 117 to not only generate a more compact update package with a correspondingly reduced download time for the update package, but to also make the update agent 117 more efficient.

In still another embodiment of the present invention, the update agent 117 may preprocess the contents of bank 1 119 through bank N 131 prior to one of the fault tolerant update methods described above. Such preprocessing may be used both at the time of generation of the update package and at the update agent 117, in order to reduce the size of the update package. Preprocessing techniques may include, for example, rearranging or reordering the contents of one or more banks, and shifting elements in one or more banks in order to align matching elements in the original and updated banks.

The use of the working bank 125 and the backup bank 127, in conjunction with the original banks (bank 1 119 through bank N 131) makes it possible for the update agent 117 to provide fault-tolerance during the update of bank 1 119 through bank N 131. Although the embodiments of the present invention are described above with respect to the use of devices with a RAM and a FLASH memory, the present invention is easily adapted to devices containing only FLASH, where the FLASH is readable, writable and executable. An embodiment in accordance with the present invention may also employ other types of non-volatile memory.

To enable the performance of a fault tolerant update, each update package stored on the update server 109 may contain predetermined verification information for each bank of the non-volatile memory 111 to be updated. The predetermined verification information may comprise the expected value of a CRC, MD5 checksum, or similar calculated value for each of the corresponding banks following a successful update. An embodiment of the present invention may use the predetermined verification information to determine the point at which to resume the update methods described above, following startup, or the occurrence of an interruption of the update process. For example, the working bank 125 is likely to be corrupted if power to the mobile handset 107 of FIG. 1 is lost or interrupted while the update of a bank is being computed. The verification information contained within the update package may be used to determine if such corruption has occurred. If the contents of the working bank are found to be corrupted, the associated original bank may be used to resume the update process, and to complete the creation of an updated copy of the original bank in the working bank. If, after the successful update of the working bank 125, the update of the current bank is interrupted, the verification information contained within the update package may be used to detect that such corruption has occurred. If the contents of the current bank is found to be corrupted, the contents of the working bank 125, if valid, or the contents of the backup bank 127 may be used to compute the updated contents of the current bank.

Figure 2:
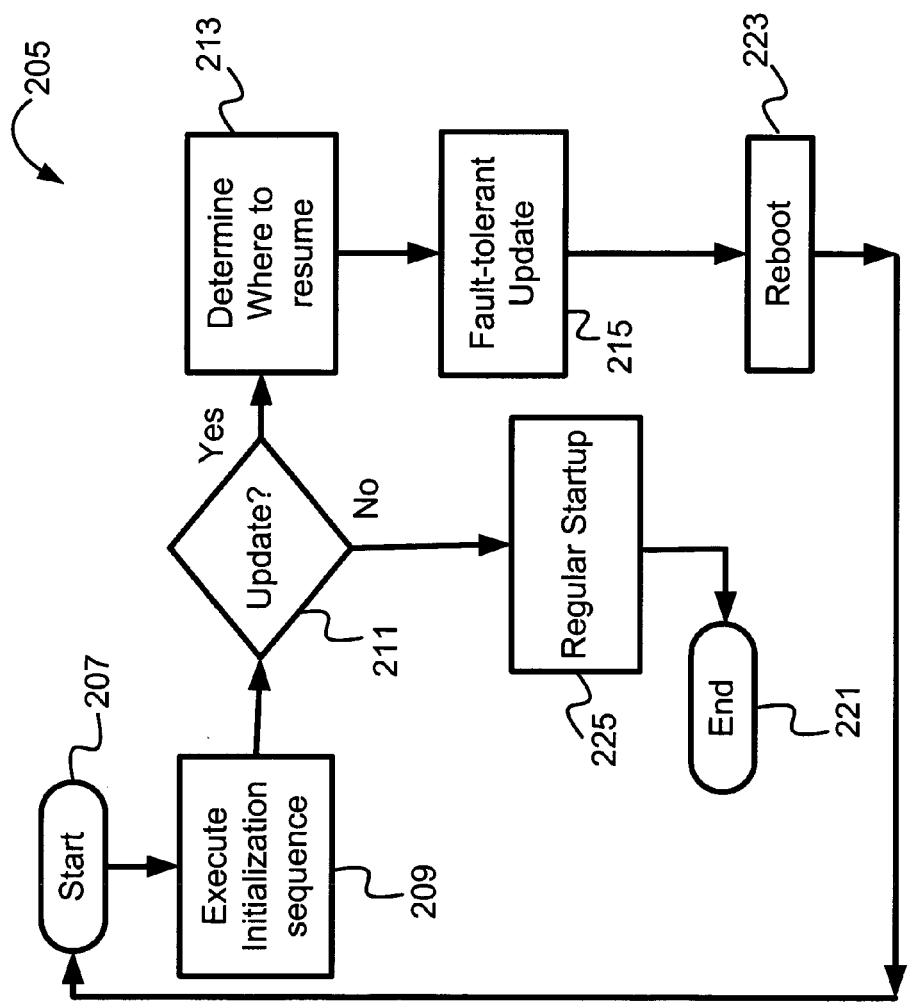
FIG. 2 is a flow chart illustrating an exemplary method of startup of a mobile handset such as the mobile handset of FIG. 1, in which a fault tolerant update agent is invoked to conduct firmware/software update operations, in accordance with the present invention.

FIG. 2 is a flow chart illustrating an exemplary method of startup of a mobile handset such as the mobile handset 107 of FIG. 1, in which a fault tolerant update agent is invoked to conduct firmware/software update operations, in accordance with the present invention. The processing starts when the mobile handset is powered up or rebooted (block 207). Next, the initialization or boot sequence is executed (block 209). A determination is then made whether an update of the firmware/software of the mobile handset is to be conducted (block 211). For example, in one embodiment, a status table may be accessed to determine if a flag in the status table indicates a need to update firmware/software using an update package previously downloaded and available in the mobile handset.

If it is determined that an update is not necessary, then the regular startup procedure of the mobile handset is executed (block 225) and startup processing terminates (block 221). If, however, it is determined that an update is necessary, then the point where the fault-tolerant update agent should resume the update process is determined (block 213). For example, that point may be at the beginning, for a newly begun update operation, or at a specific bank of non-volatile memory, in the case of a previously initiated but interrupted update operation. Next, the various operations related to the fault-tolerant update process are conducted by the update agent (block 215). Finally, the update agent initiates a reboot of the mobile handset (block 223).

Figure 3:
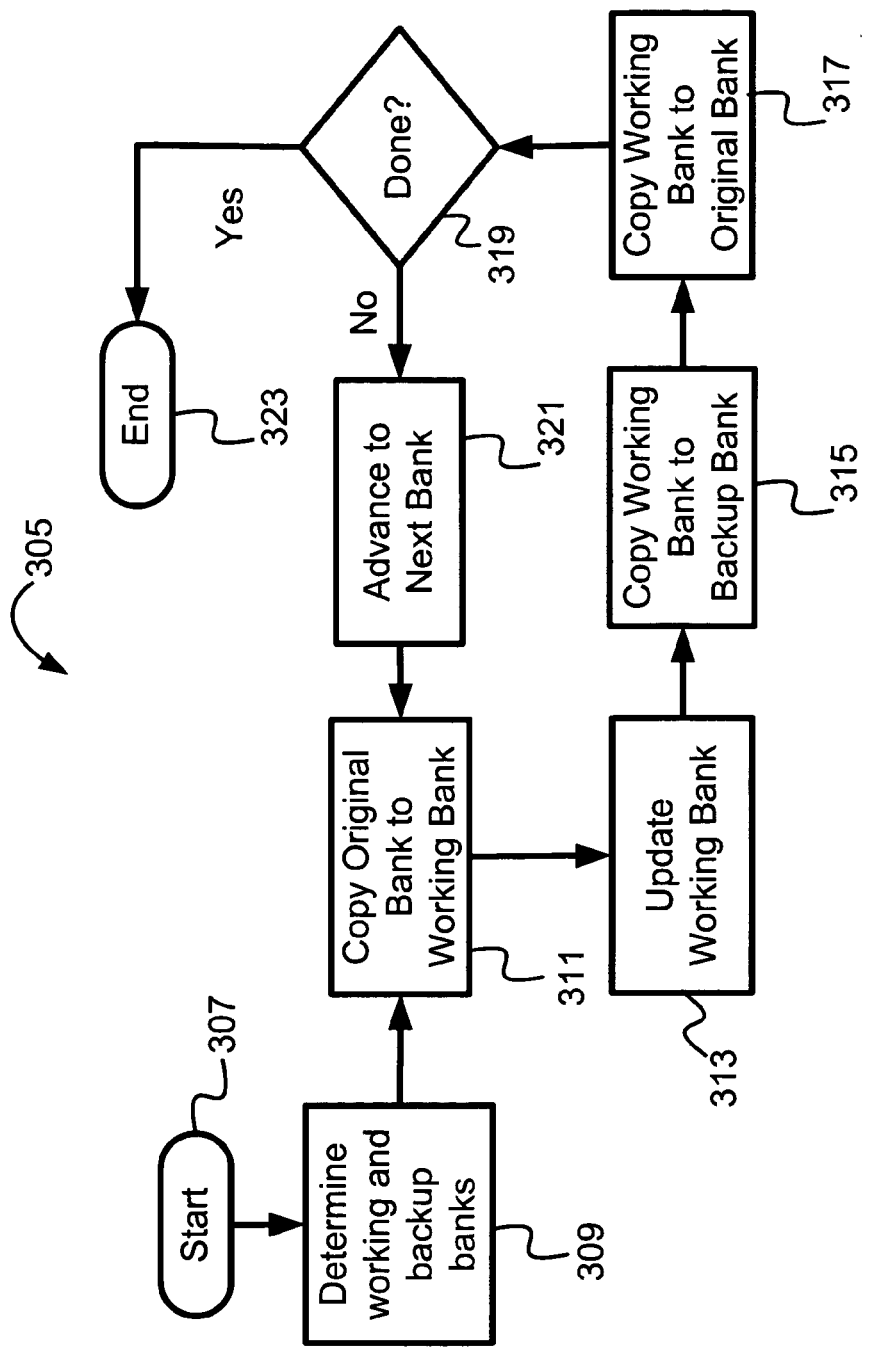
FIG. 3 is a flow chart illustrating an exemplary method of performing a fault tolerant update of a mobile handset such as the mobile handset of FIG. 1 wherein a working bank, a backup bank, and a plurality of updateable original banks are employed in the update process, in accordance with the present invention.

FIG. 3 is a flow chart illustrating an exemplary method of performing a fault tolerant update of a mobile handset such as the mobile handset 107 of FIG. 1 wherein a working bank, a backup bank, and a plurality of updateable original banks are employed in the update process, in accordance with the present invention. The process starts when the mobile handset detects that an update of firmware/software is necessary, and the point in memory at which the update needs to begin or resume is determined (block 307). For example, in one embodiment of the present invention, the point at which update processing should begin or resume may be determined using a verification process in which a CRC value is computed for each bank of non-volatile memory being updated. The computed value for each bank is then compared to the corresponding pre-computed value in a list of CRC values provided within the update package containing the firmware/software. The comparison continues in a bank-by-bank fashion through the list until a bank of non-volatile memory is encountered where the computed CRC value fails to match the value in the list for that bank. The failed match indicates an anomaly or corruption, thus indicating the point at which the update activity should start or resume.

Next, the addresses or locations of the working bank and the backup bank are determined (block 309). In one embodiment, the location and length information of these banks may be provided by associated pointers that are stored in a status table or a configuration structure maintained by, or accessible by, the update agent. The update agent then copies the original bank to the working bank so that it may be updated using the instructions and data provided in the update package (block 311). Next, the working bank is updated by the update agent, and a CRC value is selectively computed to verify the success of the update process (block 313). The working bank with its updated content are then copied to the backup bank, to provide a source of data in case a subsequent copy of the updated working bank to the original bank should fail due to power failure or other reasons (block 315).

Next, the working bank is copied to the original bank (block 317). If this process is interrupted before it is successfully completed, a subsequent power cycle or re-boot will determine that the contents of the backup bank is valid and initiate a copy of the backup bank to the original bank, to continue with the update process.

A determination is then made whether all the banks in the firmware/software update have been updated (block 319). If the update process has been completed, then the update process terminates (block 323). If the update process has not yet been completed, then arrangements are made to proceed to the next bank (block 321). The next bank may, for example, be specified by a bank order specification in the update package. Processing then continues as the original contents of the next bank are copied to the working bank in order to update the contents of the next bank (block 311).

Figure 4:
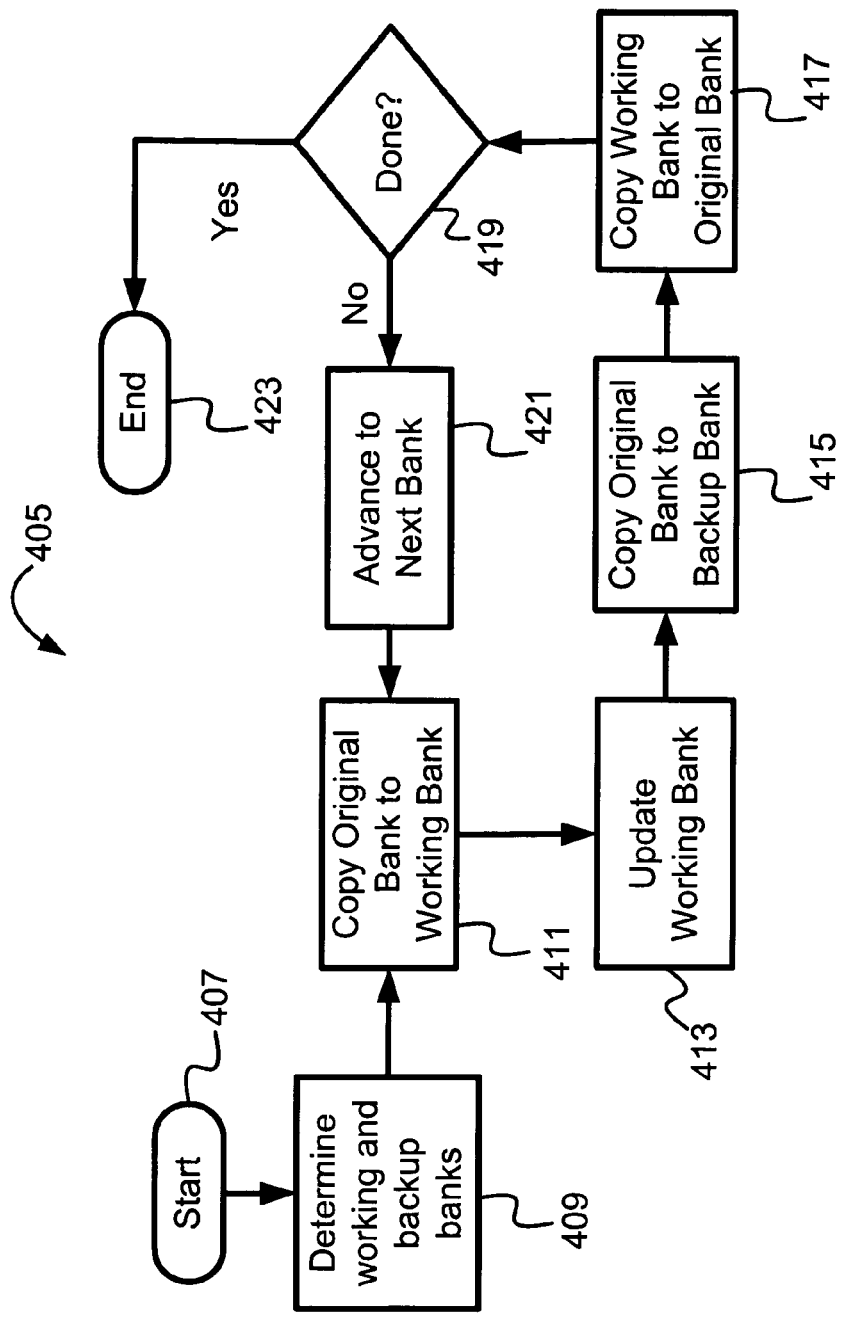
FIG. 4 is a flow chart illustrating another exemplary method of performing a fault tolerant update of a mobile handset such as the mobile handset of FIG. 1, in which a backup bank is employed to preserve a copy of the original contents of the current bank, in accordance with the present invention.

FIG. 4 is a flow chart illustrating another exemplary method of performing a fault tolerant update of a mobile handset such as the mobile handset 107 of FIG. 1, in which a backup bank is employed to preserve a copy of the original contents of the current bank, in accordance with the present invention. In the method illustrated in FIG. 4, the processing starts when the mobile handset detects that an update of firmware/software is necessary, and the point in memory at which the update needs to begin or resume is determined (block 407). For example, in one embodiment of the present invention, the point at which update processing should start or resume may be determined using the verification process described above with respect to FIG. 3.

Next, the addresses or locations of the working bank and the backup bank are determined (block 409). In one embodiment of the present invention, the location and length information of these banks may be provided by associated pointers that are stored in a status table or a configuration structure maintained by, or accessible by, the update agent. The update agent then copies the current original bank to the working bank so that it may be updated using the instructions and data provided in the update package (block 411). Next, the working bank is updated by the update agent, and a CRC value (or a MD5 checksum, etc.) is computed to verify the success of the update process (block 413).

The original contents of the current bank (also called the "original bank") are then copied to the backup bank, to provide a source of data in case a subsequent copy of the updated working bank to the original bank should fail due to power failure or other reasons (block 415). Next, the working bank is copied to the original bank (block 417). If this process is interrupted before it is successfully completed, a subsequent power cycle or reboot will determine that the contents in the backup bank is the valid original contents of the original bank and initiate a copy of the backup bank to the working bank, to continue with the update process.

The process then determines if all the banks have been updated (block 419). If the update process has been completed, the update process is terminated (block 423). If the update process is not complete, then arrangements are made to proceed to the next bank (block 421). The next bank may, for example, be specified by a bank order specification in the update package containing the firmware/software update. Processing then continues with the next original bank, which is copied to the working bank in order to begin the process of updating it (block 411).

Figure 5:
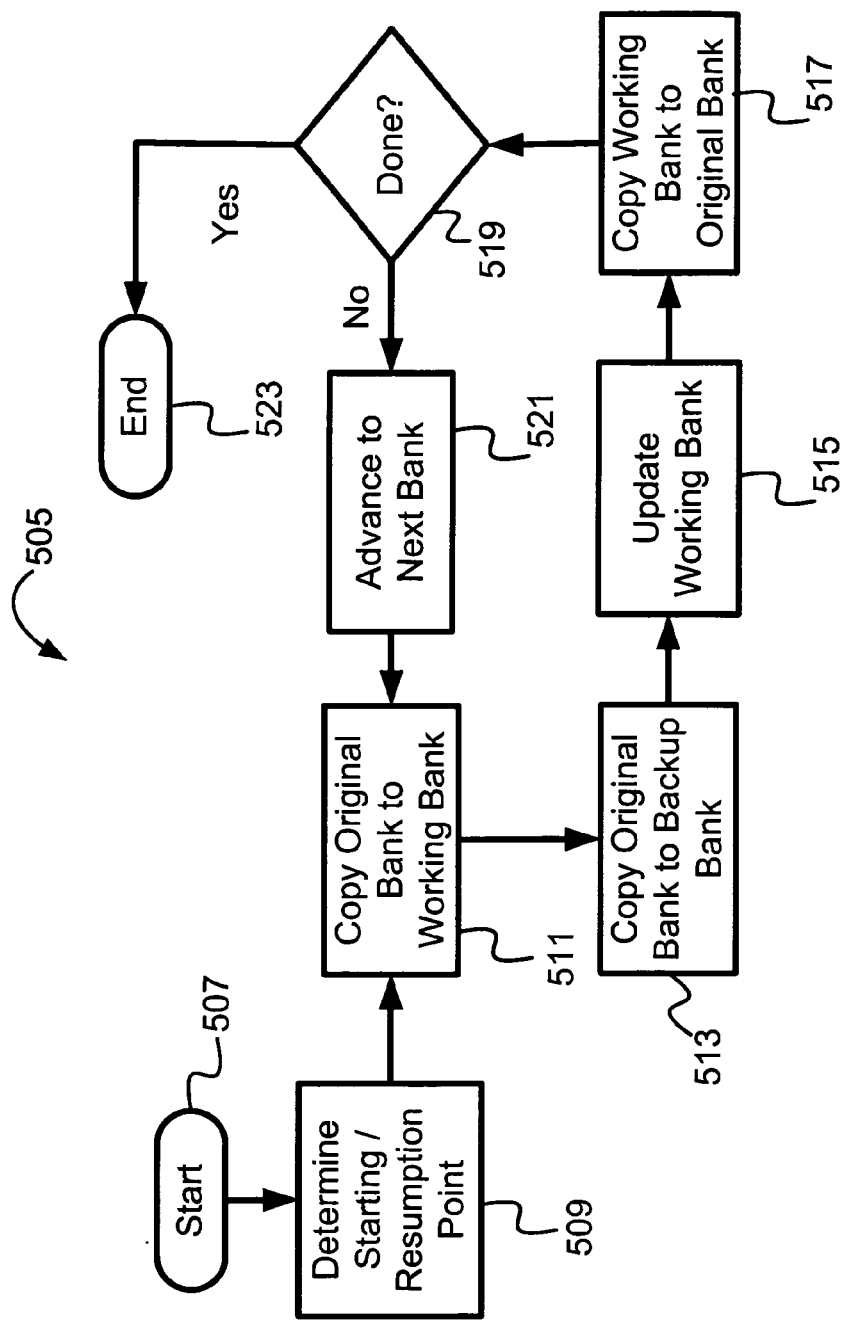
FIG. 5 is a flow chart depicting another exemplary method of performing a fault tolerant update of a mobile handset, such as the mobile handset of FIG. 1, in which the operation of the copying of the original bank to the backup bank precedes the updating of the working bank, in accordance with the present invention.

FIG. 5 is a flow chart depicting another exemplary method of performing a fault tolerant update of a mobile handset, such as the mobile handset 107 of FIG. 1, in which the operation of the copying of the original bank to the backup bank precedes the updating of the working bank, in accordance with the present invention. In this embodiment, the operations of block 413 and 415 of FIG. 4 have been interchanged, such that the working bank is updated after the original bank is copied into the backup bank. After starting the update process (block 507), the original bank is copied into the working bank (block 511), and also to the backup bank (block 513). The working bank is then updated (block 515), and the updated working bank is copied into the original bank (block 517). The processing from that point onward is similar to that illustrated in the process of FIG. 4.

Figure 6:
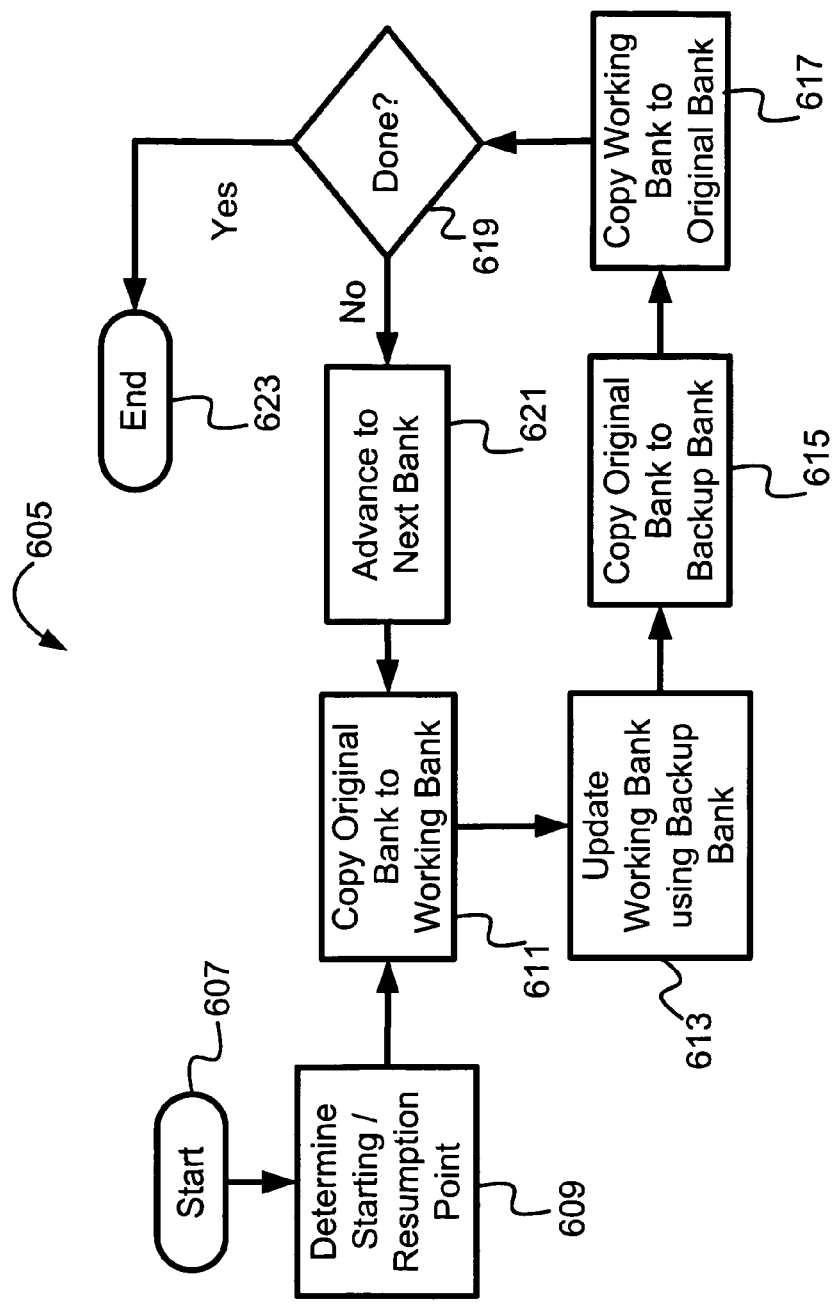
FIG. 6 is a flow chart depicting yet another exemplary method of performing a fault tolerant update of a mobile handset such as the mobile handset of FIG. 1, in which the update operations for a given bank employ the original as well as the updated contents of the preceding bank in the bank order, in accordance with the present invention.

FIG. 6 is a flow chart depicting yet another exemplary method of performing a fault tolerant update of a mobile handset such as the mobile handset 107 of FIG. 1, in which the update operations for a given bank employ the original as well as the updated contents of the preceding bank in the bank order, in accordance with the present invention. The process starts when the mobile handset detects that an update of firmware/software is necessary, and the point in memory at which the update needs to begin or resume is determined (block 607). Next, the addresses or locations of the working bank and the backup bank are determined (block 609). The update agent then copies the original bank to the working bank, so that it may be updated (block 611). The update may use the update instructions and data provided in the update package, along with the contents of the backup bank and other banks, such as bank 1 119 through bank J 123 of FIG. 1. Depending upon the bank order specified in the update package, the banks such as bank 1 119 through bank J 123 may have already been updated, or they may contain the original contents.

Next, the update agent updates the working bank using the contents of the backup bank (block 613). At this point in the process, the backup bank contains a copy of the original contents of the preceding bank in the bank order. The contents of the backup bank thus provides an enhanced "locality of reference", since it is expected to contain code segments or data that may have been relocated from the original bank in the newer version of the firmware/software. After the working bank has been updated, a CRC value (or a MD5 checksum, etc) is computed to verify the results of the update operations on that bank.

The original contents of the current bank (also called the "original bank") are then copied to the backup bank, to provide a source of data in case a subsequent copy of the updated working bank to the original bank should fail due to power failure or other reasons (block 615). The contents of the original bank may be used during the update of the next bank in the bank order. The updated working bank is then copied to the original bank (block 617). If this process is interrupted before it is successfully completed, a subsequent power cycle or reboot will determine that an update is in progress, and that contents of the backup bank is the valid original contents of the original bank. It will then copy the backup bank to the working bank, and continue with the update process.

Next, the update agent determines whether the update process has been completed and all the banks have been updated (block 619). If all banks in the bank order have been completed, the update process terminates (block 623). If it is determined that the update process has not yet been completed, then processing proceeds with the next bank (block 621). As discussed above, the next bank may be specified by a bank order specification contained within the update package. Processing then continues, by copying the next original bank in the bank order to the working bank to update its contents (block 611).

In the above manner, the update agent facilitates fault tolerant updates of firmware/software employing a working bank, a backup bank, and one of a plurality of original banks. In one embodiment, the backup bank stores a backup copy of the original bank while the updated working bank is being written to the original bank. In another embodiment, it holds the backup copy of the contents of the updated working bank. In yet another embodiment, it stores both the backup copy of the original bank as well as the backup copy of the updated working bank.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of updating an electronic device comprising a non-volatile memory having a plurality of banks containing a first code version, the method comprising:
    (a) selecting one of the plurality of banks;
    (b) duplicating the selected bank to a working bank;
    (c) copying the selected bank to a backup bank;
    (d) converting the contents of the working bank from the first code version to a second code version;
    (e) moving the converted working bank to the selected bank;
    (f) verifying the successful completion of at least one of the duplicating, the copying, and the converting using at least one of a cyclic redundancy check, a message digest, a digital signature, and a checksum; and
    (g) repeating (a) through (f) until each of the plurality of banks has been updated.

2. The method of claim 1 wherein the converting uses at least one update instruction.

3. The method of claim 1 wherein the working bank is located in volatile memory.

4. The method of claim 1 wherein the selecting uses at least one of at least a cyclic redundancy check, a message digest, a digital signature, a checksum, and a specified bank order.

5. The method of claim 4 wherein the selecting uses at least one of a cyclic redundancy check, a message digest, a digital signature, and a checksum when resuming the updating following one of at least a reset or a power up, and wherein the selecting uses a specified bank order at all other times.

6. The method of claim 1 further comprising: receiving an update package.

7. The method of claim 6 wherein the update package comprises at least one update instruction.

8. The method of claim 6 wherein the update package comprises a bank order specification.

9. The method of claim 6 wherein the receiving is accomplished using a public network.

10. The method of claim 6 wherein the receiving is accomplished using a wireless network.

11. The method of claim 1 further comprising:
    determining the progress of the updating using at least one of at least a cyclic redundancy check, a message digest, a digital signature, and a checksum.

12. The method of claim 1 wherein the converting uses at least a portion of at least one of the plurality of banks other than the selected bank.

13. A method of updating an electronic device from a first code version to a second code version, the electronic device comprising a non-volatile memory having a plurality of banks containing the first code version, the method comprising:
    (a) receiving an update package comprising at least one update instruction;
    (b) selecting one of the plurality of banks using at least one of at least a cyclic redundancy check, a message digest, a digital signature, a checksum, and a specified bank order;
    (c) converting the selected bank from the first code version to the second code version using the at least one update instruction; and
    (d) repeating (b) through (c) in a bank by bank manner until each of the plurality of banks has been updated.

14. The method of claim 13 wherein the selecting uses at least one of at least a cyclic redundancy check, a message digest, a digital signature, and a checksum when resuming the updating following at least one of a reset and a power up, and wherein the selecting uses a specified bank order at all other times.

15. The method of claim 13 wherein the converting further comprises:
    duplicating the selected bank to a working bank;
    copying the selected bank to a backup bank;
    transforming the contents of the working bank from the first code version to the second code version; and
    moving the transformed contents of the working bank to the selected bank.

16. The method of claim 15 wherein the working bank is located in volatile memory.

17. The method of claim 13 wherein the converting uses at least a portion of at least one of the plurality of banks other than the selected bank.

18. The method of claim 13 wherein the update package comprises a bank order specification.

19. The method of claim 13 wherein the banks are selected in a non-sequential bank order.

20. The method of claim 13 wherein the receiving is via a public network.

21. The method of claim 13 wherein the receiving is via a wireless network.

22. A method of updating an electronic device from a first code version to a second code version, the electronic device comprising a non-volatile memory having a plurality of banks containing the first code version, the method comprising:
    (a) receiving an update package comprising at least one update instruction using a public network;
    (b) selecting one of the plurality of banks;

(c) converting the selected bank from the first code version to the second code version using the at least one update instruction; and (d) repeating (b) through (c) in a bank by bank manner until each of the plurality of banks has been updated.

23. The method of claim 22 wherein the converting further comprises:
    duplicating the selected bank to a working bank;
    copying the selected bank to a backup bank;
    transforming the contents of the working bank from the first code version to the second code version; and
    moving the transformed contents of the working bank to the selected bank.

24. The method of claim 23 wherein the working bank is located in volatile memory.

25. The method of claim 23 wherein the transforming uses the original and the transformed contents of the previously updated bank, in addition to at least one other of the plurality of banks.

26. The method of claim 22 wherein the converting uses at least a portion of at least one of the plurality of banks other than the selected bank.

27. The method of claim 22 wherein the selecting uses at least one of at least a cyclic redundancy check, a message digest, a digital signature, a checksum, and a specified bank order.

28. The method of claim 27 wherein the selecting uses at least one of at least a cyclic redundancy check, a message digest, a digital signature, and a checksum when resuming the updating following at least one of a reset and a power up, and wherein the selecting uses a specified bank order at all other times.

29. The method of claim 22 wherein the update package comprises a bank order specification.

30. The method of claim 22 wherein the one of the plurality of banks is selected in a non-sequential bank order.

* * * * *